United States Patent [19]
Helsley, Jr.

[11] Patent Number: 6,108,895
[45] Date of Patent: Aug. 29, 2000

[54] METHOD OF AXIALLY SWAGING A MALE END FITTING ASSEMBLY

[75] Inventor: Charles Warren Helsley, Jr., Anaheim, Calif.

[73] Assignee: The Deutsch Company, Gardena, Calif.

[21] Appl. No.: 08/711,243

[22] Filed: Sep. 9, 1996

[51] Int. Cl.$^7$ .............................. B23P 11/00; B21K 25/00
[52] U.S. Cl. ................................ 29/516; 29/515; 29/520; 29/521; 285/382.7
[58] Field of Search .............................. 29/515, 516, 517, 29/520, 521, 725, 244, 272, 281.1, 281.3, 282, 283.5; 285/382.7, 382.2, 382.1

[56] References Cited

U.S. PATENT DOCUMENTS

| | | | |
|---|---|---|---|
| 2,335,414 | 11/1943 | Hinrichs | 29/517 X |
| 2,394,351 | 2/1946 | Wurzburger | 285/382.7 X |
| 2,862,732 | 12/1958 | Guillou | 29/516 X |
| 3,112,940 | 12/1963 | Crawford | 285/382.7 X |
| 3,290,069 | 12/1966 | Davis | 285/382.7 X |
| 3,474,519 | 10/1969 | Hallesy | 29/525 X |
| 3,726,122 | 4/1973 | Dawson . | |
| 3,787,080 | 1/1974 | Daniel | 285/382.7 X |
| 3,805,567 | 4/1974 | Agius-Sinerco . | |
| 3,921,281 | 11/1975 | Mattori et al. | 29/283.5 |
| 3,970,336 | 7/1976 | O'Sickey et al. | 29/516 X |
| 5,080,406 | 1/1992 | Hyatt et al. | 29/517 X |
| 5,452,921 | 9/1995 | Hyatt et al. . | |
| 5,544,406 | 8/1996 | Ridenour et al. | 29/516 X |
| 5,592,726 | 1/1997 | Suresh | 29/282 |

FOREIGN PATENT DOCUMENTS

| | | | |
|---|---|---|---|
| 539886 | 7/1956 | Italy | 285/382.7 |
| 103408 | 11/1962 | Netherlands | 29/283.5 |
| 590989 | 8/1947 | United Kingdom | 285/382.7 |

OTHER PUBLICATIONS

NAS 1760 Fitting End, Flareless Acorn (1974).
Military Standard MS21922, Sleeve, Coupling, Flareless (1956).
SAE AS4696 Fitting, Flareless, Sleeve (1994).
AMCI Cryolive Brochure (1993).
Sierracin/Harrison 35235 Sleeve, Flareless Swaged Tube (undated).

*Primary Examiner*—David P. Bryant
*Assistant Examiner*—Marc W. Butler
*Attorney, Agent, or Firm*—Sheppard, Mullin, Richter & Hampton LLP; John A. Griecci

[57] ABSTRACT

The invention relates to an axially-swaged male end fitting assembly compatible with a standard 24° cone flareless female fitting. The fitting may be fabricated from a sleeve and a tube that are axially swaged within a tool assembly. The sleeve includes a rounded shoulder, a partially conical nose, and a cylindrical inner surface. The inner surface includes a groove at the tip of the nose, and another groove positioned axially close enough to the shoulder to be radially deformed during axial swaging. The tool assembly includes a swaging tool, a female die and a ring die. The female die includes a tapered surface positioned and sized to preset the nose into the tube. The female die also has a surface confronting the sleeve shoulder, for controlling the amount of preset that occurs. The ring die includes a tapered surface positioned and sized to swage the shoulder into the tube. The ring die may be sized to be received around the female die after swaging, freeing the sleeve from contact with the ring die's swaging surfaces.

7 Claims, 6 Drawing Sheets

METHOD OF AXIALLY SWAGING A MALE END FITTING ASSEMBLY

BACKGROUND OF THE INVENTION

This invention relates to high-pressure capable end fittings on tubing and, more particularly, to a sleeve, a tool assembly, and a method of using the sleeve and tool assembly to form axially-swaged, male end fitting assemblies for use with cone female fittings.

Aerospace and high performance commercial hydraulic system applications commonly require high-pressure fittings to connect lengths of tubing. Important attributes of superior fittings include pressure capability, size and weight, and tensile, torsional and bending strength. The time, cost and likelihood of defects occurring in the making of a fully qualified and inspected fitting are important aspects to consider in selecting which fitting is appropriate for a given application. The 24° cone flareless female fitting has been one of the most widely accepted hydraulic fitting types used for aerospace and high performance commercial hydraulic system applications. Numerous variations of the male end fitting assemblies used with this well-accepted female fitting are presently produced. However, all such variations suffer deficiencies in one or more of the above attributes and selection aspects.

The most commonly used male end fitting assembly for a 24° cone flareless female fitting (see FIG. 1) comprises essentially a nut 101 and a shouldered sleeve 102 to be placed over the end of a tube 103. The sleeve includes a shoulder 104 and a cylindrical nose 105 oriented to face a female end fitting 106 when the fitting is assembled. The shoulder has corners that are not rounded, being machined only enough to remove burrs and break sharp edges. Thus, on a half-inch fitting, the corners' radii are likely to be on the order of 0.002 to 0.006 inches. The female fitting has a threaded outer surface 107, and a conical inner surface 108 that receives the tubing and sleeve of the male end fitting assembly. When the fitting is first assembled, the nut is screwed onto the threaded outer surface, forcing the nose end of the sleeve into a gap existing between the conical surface and the tube. As the nut is advanced, the nose end of the sleeve deforms radially into the tube, forming a permanent "preset" deformation 109. The tube and sleeve become a unit, and thus the fitting may then be disassembled and reassembled without disturbing the preset.

Figure 1:
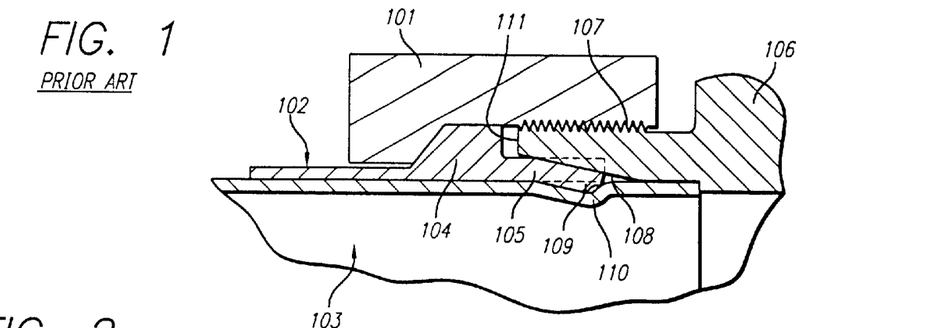
FIG. 1 is a cross-sectional, elevational view of a standard, PRIOR ART 24° cone flareless fitting.

Although the 24° cone flareless fitting is an effective fitting, the male end fitting assemblies used with it suffer from limited strength, limited flexural endurance, and a susceptibility to over-torquing. In particular, the strength and endurance are limited by the form of connection between the sleeve 102 and the tube 103. The connection is formed by a localized circular "dig-in point" 110 at one axial location around the tube where the nose 105 end of the sleeve digs into the tube during presetting. This dig-in point provides a limited contact area, leading to weakness in tensile and torsional strength. At the same time, the dig-in point is a location of high stress concentration, leading to reduced bending strength and poor flexural endurance. No significant support, to improve bending strength, comes from the length of the sleeve because the necessary diametral gap between the tube and the sleeve does not allow the sleeve to pick up any significant load before the preset stress concentration point (the dig-in point) is over-stressed.

During tightening of the fitting nut 101, the fitting might easily be over-torqued. Over-torquing causes excessive digging in by the end of the nose 105, locally constricting fluid flow through the tube 103. Eventually, over-torquing causes the sleeve's shoulder 104 to bottom out against an end 111 of the cone flareless female fitting, diminishing the ability of the fitting to subsequently seal on later reassembly. While the adverse effects of over torquing may be overcome on initial factory assembly by using presetting tools, they frequently reappear during field servicing when wrenches are used to manually tighten and retighten the nut.

Figure 2:
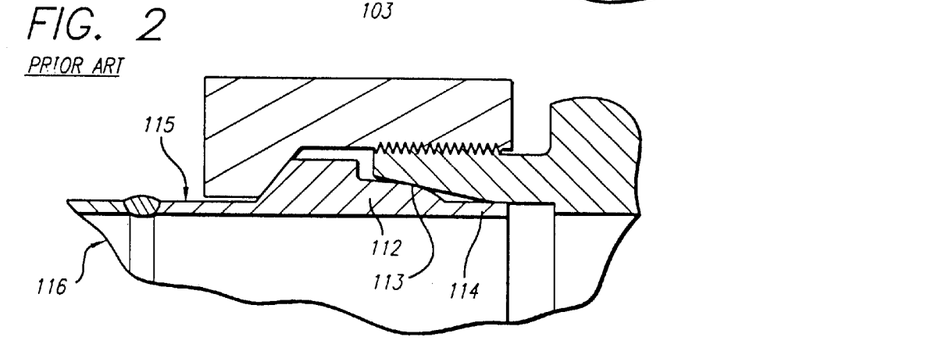
FIG. 2 is a cross-sectional, elevational view of a PRIOR ART 24° cone flareless fitting using a welded variation of the NAS 1760 male end fitting.

Numerous attempts have been made to improve the performance of the male end fitting assembly of the 24° cone flareless fitting. For example, the National Aerospace Standard NAS 1760 male end fitting, shown in FIG. 2, represents a proposed alternative. It provides a one-piece end with a cylindrical nose 112 with a spherically curved tip 113. The nose is shaped to simulate the nose of a male end fitting assembly that has already been preset, and thus includes a cylindrical nose extension 114 to simulate a tube extending out of a sleeve. FIG. 2 depicts a variation 115 of the NAS 1760 attached end-to-end with a tube 116, e.g., by welding, leaving the nose free for attachment to a 24° cone flareless female fitting. Welding, however, is a labor intensive operation requiring exceptional cleanliness, and extensive inspection, generally including the use of x-ray inspection. Thus, welding a NAS 1760 end to a tube is a costly and time-consuming option.

Figure 3:
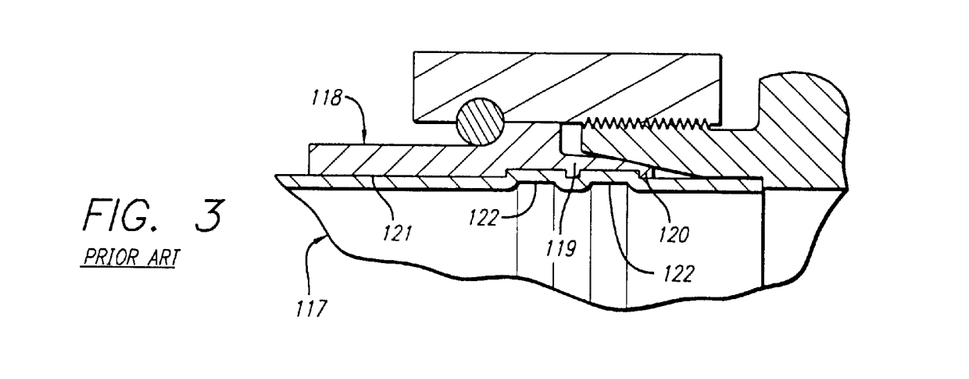
FIG. 3 is a cross-sectional, elevational view of a PRIOR ART 24° cone flareless fitting using an internally swaged male end fitting assembly.

Internal swaging has also been used to attach a sleeve to a tube (see FIG. 3). The tube 117 is inserted into a sleeve 118 designed for internal swaging. The sleeve includes a cylindrical nose 119 with a spherically curved tip 120. The sleeve has an inner surface 121 including axially spaced, circular teeth 122 to seal against the tube when the tube is expanded outward during internal swaging. An internal swaging mechanism is used to expand the tube into gaps formed between the teeth of the internally swaged sleeve. While this provides a male end fitting with strength that is superior to that of the preset male end fitting assembly, the internally swaged fitting is both heavier and longer. The tooling required to perform internal swaging is costly. Furthermore, that tooling is complex and subject to deterioration and failure, leading to defects in the swaged area that are not detectable by simple inspection methods.

Figure 4:
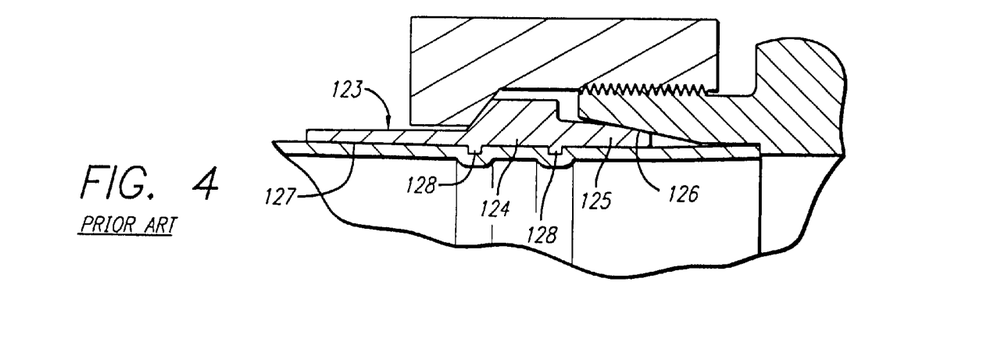
FIG. 4 is a cross-sectional, elevational view of a PRIOR ART 24° cone flareless fitting using a heat-shrinkable sleeve.

Another known approach for securing a sleeve to a tube, shown in FIG. 4, is to use a heat-shrinkable alloy. The sleeve 123 includes a shoulder 124, a cylindrical nose 125 with a spherically curved tip 126, and an inner surface 127 with a plurality of axially spaced circular teeth 128 around the inside of the sleeve. The sleeve is made to its "shrunk" size and then is expanded by a mandrel while immersed in liquid nitrogen. It retains its expanded size so long as it remains in the liquid nitrogen. To join the sleeve to the tube, the expanded sleeve is removed from the liquid nitrogen and placed upon the tubing, where it returns to room temperature and approaches its original size. Because the tube blocks the sleeve from shrinking to its original size, the sleeve remains elastically partially expanded, with its teeth dug into the tube. Thus, a preset male end fitting assembly with a NAS 1760 axially-curved nose is simulated. The torsional strength of the heat-shrinkable male end fitting assembly, however, is no better than that of the "preset" sleeve. The use of liquid nitrogen involves high expense and places time constraints on the attachment operation, which must be done within the few seconds that the sleeve remains expanded after removal from the liquid nitrogen. The cost and difficulty are further driven up by the need to chill and temperature stabilize the tubing end prior to attachment. Also, the cost of heat-shrinkable material is significantly higher than that of standard sleeve materials.

Figure 5:
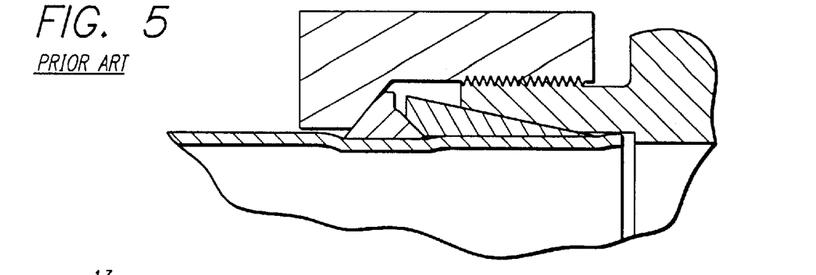
FIG. 5 is a cross-sectional, elevational view of a PRIOR ART 24° cone flareless fitting using a multi-ring squeezable sleeve assembly.

Another known simulation of a preset male end fitting assembly, depicted in FIG. 5, includes two partial sleeves that are axially squeezed between a 24° cone 129 and a nut 130 (or a tool providing the equivalent surfaces). The first partial sleeve 131 includes a surface 132 conforming to the 24° cone, and a second surface 133 at 45°. The second partial sleeve 134 includes a conforming 45° surface 135, and a surface 136 conforming to the nut. Upon squeezing, the first partial sleeve is radially compressed by being pressed into the 24° cone, while the second partial sleeve is radially compressed by being pressed into the 45° surface of the first partial sleeve. The resulting male end fitting assembly has one ring shaped indentation formed within each partial sleeve, and discontinuity of indentation at either end of each partial sleeve.

This simulated male end fitting assembly is difficult to assemble. Twice as many parts must be kept in stock, and caution must be used that the parts are used in the proper respective positions. Use of a nut to form the assembly is limited to very soft tubing because the male end fitting assembly requires a high squeezing force. This high level is required by the steep incline of the 45° angled surfaces 133 & 135, and by the fact that the second partial sleeve 134 pushes radially outward on the first partial sleeve 131 during the squeezing. This high level increases exponentially as tube hardness goes up.

Accordingly, there has existed a definite need for a male end fitting assembly demonstrating high-pressure capability, low size and weight, high tensile strength, torsional strength, and flexural endurance. The installation time, the fabrication cost and the likelihood of over-torquing for the fully qualified and inspected fitting should be minimized. The present invention satisfies these and other needs, and provides further related advantages.

SUMMARY OF THE INVENTION

The present invention provides a sleeve, a tool assembly, a male end fitting assembly compatible with a standard 24° cone flareless female fitting, and a method of using the sleeve and tool assembly to form the male end fitting assembly. The resulting male end fitting assembly demonstrates high-pressure capability, high tensile and torsional strength, and good flexural endurance, while having a small size and weight. The length of time and the expense required in the making of a fully qualified and inspected fitting are improved. Furthermore the male end fitting assembly is resistant to over-torquing on cone female fittings.

The method of the present invention includes positioning a sleeve and a tube within a tool assembly. The sleeve includes a shoulder and a nose, and has a cylindrical inner surface. The tool assembly includes a swaging tool, a female die and a ring die. The tube is inserted within the sleeve, and the female die and ring die are axially spaced along the tube, adjoining the sleeve from axially-opposing sides of the sleeve. The female die includes an inner tapered surface positioned and sized to preset the nose into the tube. The method also includes axially compressing the sleeve between the female die and ring die such that the sleeve nose becomes preset into the tube.

A feature of the invention is that the ring die includes a tapered surface positioned and sized to swage the shoulder into the tube. Thus, the axial motion of the ring die and trapping of the sleeve between the female die and ring die swages the sleeve and forces radial deformation of the shoulder into the tube, causing the shoulder to be plastically and permanently compressed radially into the tube.

This feature provides numerous advantages in size, strength and endurance. In particular, the swaging of the sleeve into the tube produces a second indentation grip on the tube. This produces substantially more contact area between the sleeve and tube for the resistance to tensile and torsional stress. The separate axial locations between the preset indentation and the shoulder swage indentation provide a moment arm that greatly improves the bending strength, and increases flexural endurance. This invention meets or exceeds known hydraulic system plumbing system requirements.

This feature also provides advantages in production. The time and cost in the making of a fully qualified and inspected fitting are minimized. The method and design are simple, providing inexpensive and uncomplicated fabrication, a single axial stroke method of assembly, and inspection requirements that generally consist only of a visual examination of the outer surfaces of the male end fitting assembly. The resultant product is consistent and reliable.

Another feature of the invention is that the shoulder includes a front face, and the female die has a confronting abutment surface. After positioning, and prior to axial compression, there is a prescribed gap between the front face and the abutment surface. An advantage of this feature is that the gap will close during presetting, causing the presetting to stop at a desired amount of preset. Thus, the amount of preset can be precisely controlled and over-deforming during preset can be prevented, avoiding the problems associated with over-torquing on a standard 24° cone flareless fitting.

Another feature of the invention is that the female die may include a generally tubular portion with an outer wall that ends at the abutment surface, and the ring die may include one or more swaging surfaces, each of which may be sized such that the ring die may be received around the tubular portion after swaging, freeing the sleeve from contact with the ring die's swaging surfaces. An advantage of this feature is that the resultant male end fitting assembly may be removed from the tool assembly without any further manipulation of the tool assembly or male end fitting assembly. Thus, the ring die does not have to be designed in pieces, or with slots designed for male end fitting assembly removal.

Another feature of the invention is that, during positioning in the female die, the tube may be positioned to abut a compliant member, such as a belleville washer. This feature provides the advantage of consistently positioning the sleeve on the tube. This advantage is achieved without the risk of tube collapse that would occur if the compliant member were replaced with a solid wall. In particular, during axial swaging the tube is moved axially along with the sleeve. If axial swaging occurred without the compliant member (against a solid wall as in the prior art), the tube would be compressed and likely collapse. Yet another advantage is that the completion of the single axial operation is signaled by the male end fitting assembly "springing" free of the tool assembly under the force applied by the compliant member, generally making a pinging noise in the process.

A related group of features of the invention is that the sleeve may be designed with a shoulder that includes an axially rounded top surface, a front face extending from the nose to the top surface, and a rear face extending from the top surface to a sleeve extension. The corners connecting between the extension, the rear face, the top surface, the front face, and the nose may each be rounded. An advantage of these features is that, during swaging, they provide added strength between the shoulder and the nearby regions of the sleeve. Thus, after swaging, the inner surface of the sleeve takes a significantly smoother, hourglass-shaped axial profile than it would if the sleeve had the sharp corners, rounded nose, and flat top surface of the prior art. This smooth profile allows the tube to maintain contact along the length of the sleeve, maximizing the strength and endurance characteristics of the resulting male end fitting assembly. Another advantage resulting from the features is that the swaging progresses more smoothly over a top surface having a rounded top and rounded connections to the front and rear faces, avoiding damage to the sleeve and ring die.

Another feature, related to the above group of features, is that the sleeve may be designed with a conical portion adjacent the shoulder. An advantage of this feature is that, as with the group of features, it provides added strength between the shoulder and the nose. Again, after swaging, the inner surface of the sleeve takes a significantly smoother, hourglass-shaped axial profile than if the sleeve had the cylindrical surface next to the shoulder of the prior art. As discussed above, this smoother profile allows the tube to maintain contact along the length of the sleeve, maximizing the strength and endurance characteristics of the resulting male end fitting assembly. Another important advantage resulting from this feature is that it aids in preventing over-torquing of the male end fitting assembly upon subsequent retightening onto a female fitting. In particular, the conical portion contacts the female die during presetting, causing an axially longer dig-in portion of preset for greater resistance to over-torquing in a cone female fitting. Yet another advantage to this feature is that the nose is thicker than the prior art, providing additional strength to the preset region.

Another feature of the invention is that the inner surface of the sleeve includes a groove at the tip of the nose, and another positioned axially close enough to the shoulder to be displaced during axial swaging. Preferably, this inner surface groove is axially located between the shoulders maximum radial thickness and the nose. An advantage of this feature is that, during swaging, the tube presses up into the grooves and forms a tight grip on the edge of the grooves, thus strengthening the resultant male end fitting assembly. A further advantage is that the groove in the nose tip aids in the presetting of the nose tip, in that the nose is turned to point more into the tube, thus improving its grip on the tube and improving the seal between the tube and the female fitting. The preferred location of the inner surface groove forms a grip that adds strength to the male end fitting assembly under tensile stress.

An additional feature of the inner surface groove is that it may be teardrop-shaped in cross-section, having a sharp corner, and a gradual corner that is closer to the nose tip than the sharp corner. An advantage of this feature is that the gradual corner allows more tubing to press up into the groove, thus improving the grip on the tube by the sharp corner. The sharp corner is thus particularly strong in preventing the tube from pulling out of the sleeve under tensile forces.

Other features and advantages of the invention will become apparent from the following detailed description, taken in conjunction with the accompanying drawings, which illustrate, by way of example, the principles of the invention.

DETAILED DESCRIPTION OF THE PREFERRED EMBODIMENTS

Figures 6, 7:
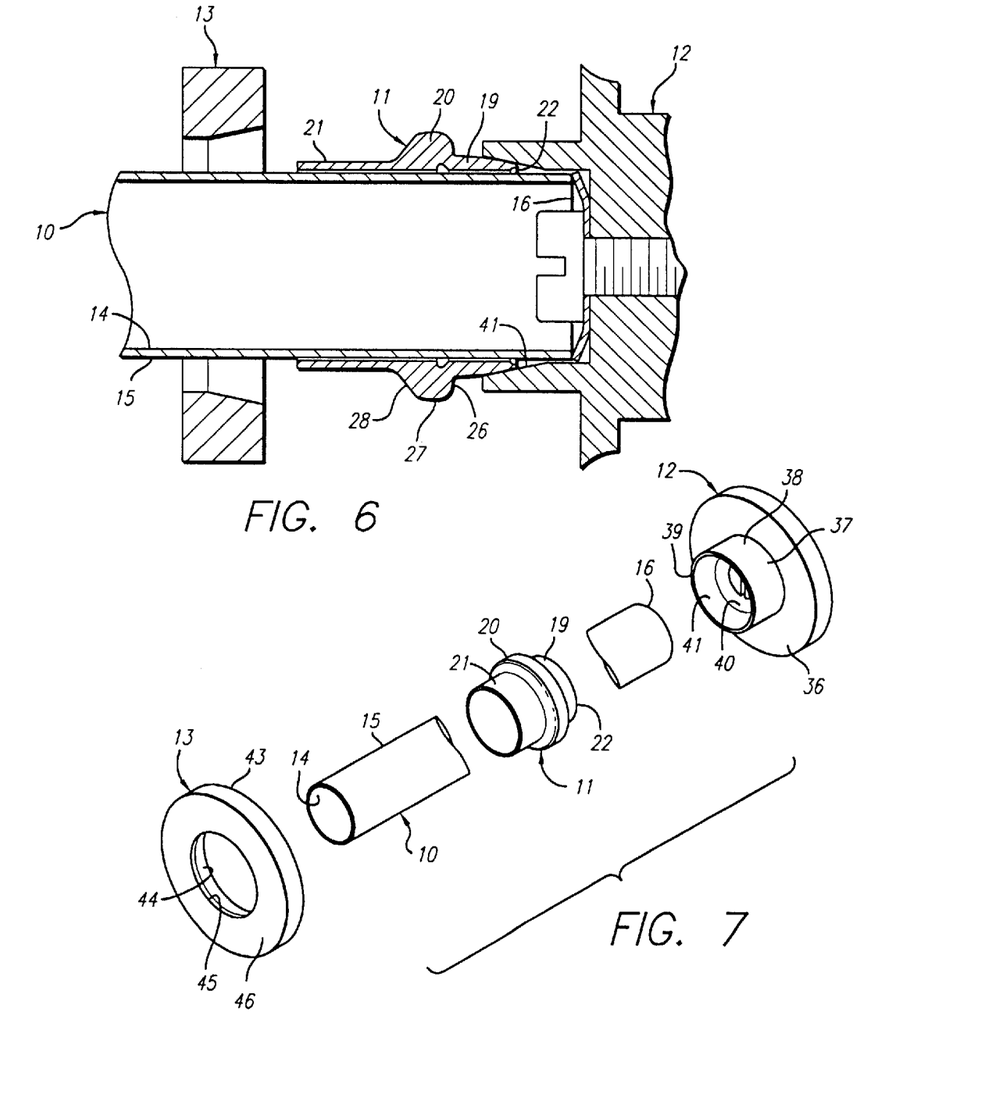
FIG. 6 is a cross-sectional, elevational view of a system for forming an axially-swaged end fitting embodying features of the present invention.
FIG. 7 is an exploded perspective view of the system depicted in FIG. 6.

A system for forming an axially-swaged, high-pressure capable male end fitting assembly according to the present invention is shown in FIGS. 6 and 7. The system includes a tube 10, a preferably unitary sleeve 11, a female die 12 and a ring die 13. The sleeve is received on the tube. The female die and the ring die are positioned on axially-opposing sides of the sleeve.

The tube 10 may be any standard tube, as is commonly used with a basic 24° cone flareless fitting. The tube has an inner surface 14, an outer surface 15 and an end 16.

Figure 8:
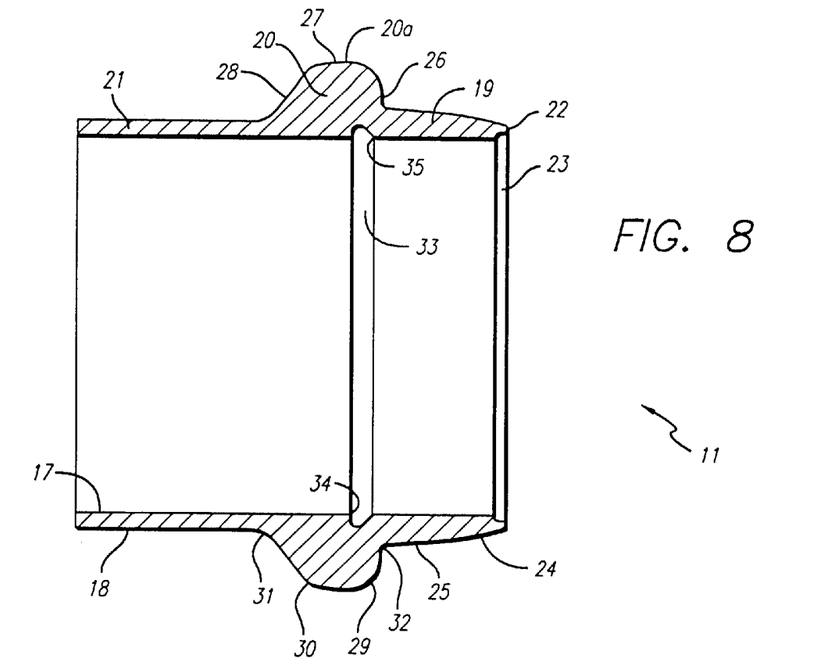
FIG. 8 is a cross-sectional, elevational view of a sleeve as used in the system depicted in FIG. 6.

With reference to FIGS. 6 and 8, the sleeve 11 has a generally cylindrical configuration that is similar to a standard 24° cone flareless fitting sleeve (as depicted in FIG. 1). The sleeve has an inner surface 17 and an outer surface 18. The inner surface is principally cylindrical.

The sleeve defines three portions: an axially extending nose 19, a radially outwardly extending shoulder 20 and an axial extension 21 on the opposite side of the shoulder from the nose. The sleeve nose 19 has a tip 22 that defines a counterbore or groove 23. The outer surface 18 that is over the nose tapers outwardly as it axially extends from the nose tip to the sleeve shoulder 20. Unlike the standard 24° cone flareless fitting, the tapered outer surface over the nose includes both a convexly curved portion 24 adjacent to the nose tip, and a conical portion 25 adjacent the shoulder. The curved portion is compatible with a standard 24° cone flareless female fitting.

The outer surface 18 that is over the shoulder 20 includes a front face 26, a top surface 27 and a rear face 28. The front face extends from the nose 19 to the top surface. Preferably, the front face is generally planar, and perpendicular to the cylindrical axis of the sleeve 11. The top surface is rounded with a curvature appropriate for creating good swaging contact between the sleeve and the tube, as described below with reference to FIG. 13. The curvature defines an axial location 20a on the shoulder having maximum radial shoulder thickness. The rear face extends from the top surface to the extension 21, and is preferably configured to conform to a standard nut for a preset male end fitting assembly. The shoulder is designed to be swaged, as will be later described, and thus the rear face must be designed accordingly to conform to the nut after swaging. Thus, the rear face is set at an angle of 38.5° so as to have a post-swaging angle of 45° to conform to a nut.

The corner 29 connecting between the adjoining front face 26 and top surface 27, and the corner 30 connecting between the adjoining top surface and rear face 28, each is preferably rounded with a radius designed to allow the transferring of a desirable contour to the inner surface for better sleeve-to-tube contact after swaging. For example, these corners as applied to a half-inch fitting have radii on the magnitude of 0.04 inches.

The outer surface 18 that is over the extension 21 is preferably cylindrical. The corner 31 connecting between the extension and the shoulder 20, and the corner 32 connecting between the shoulder and the nose 19, each is preferably rounded with a radius designed to strengthen the corner for better sleeve-to-tube contact after swaging. For example, these corners of a half-inch fitting have radii on the magnitude of 0.04 inches.

The inner surface 17 includes one or more grooves 33 axially between the location 20a of maximum shoulder radial thickness and the nose 19. The grooves are preferably teardrop-shaped in cross-section, having a sharp corner 34, and a gradual corner 35 that tapers toward the inner surface. The gradual corner's taper may be conical or rounded. The gradual corner is closer to the nose than the sharp corner. Grooves may also be usefully placed at other locations that are to be radially displaced during swaging.

Figure 9:
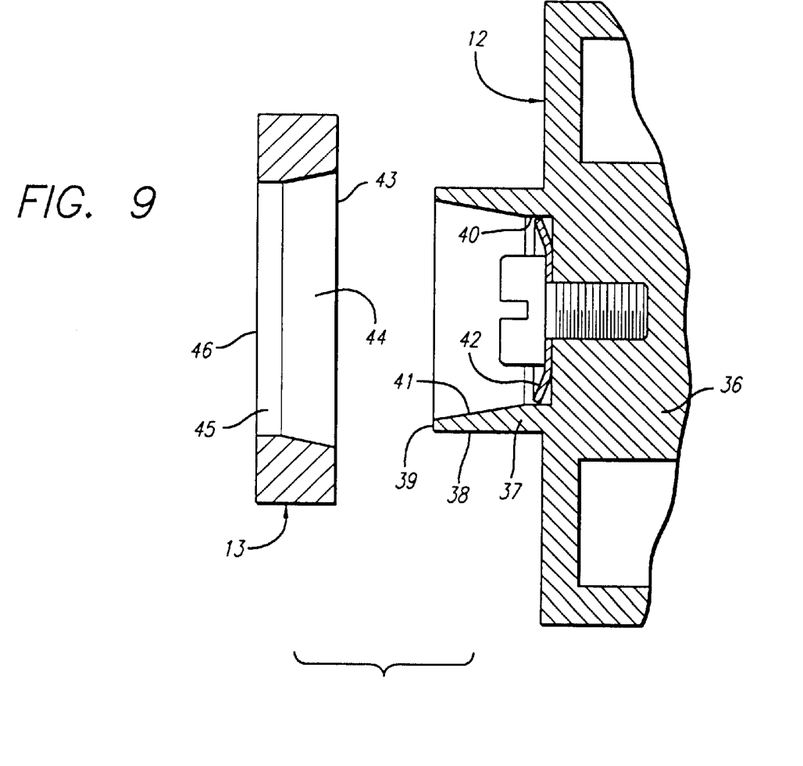
FIG. 9 is a cross-sectional, elevational view of a female die and ring die as used in the system depicted in FIG. 6.

With reference to FIGS. 7 and 9, the female die 12 includes a base 36 and a generally tubular portion 37 extending from the base. The tubular portion has a generally cylindrical outer wall 38, which extends from the base to an approximately radial, annular abutment surface 39. The tubular portion also has an inner surface extending from the base to the abutment surface. The inner surface includes a cylindrical portion 40 adjoining the base, and a tapered surface 41 for presetting. The tapered surface adjoins both the abutment surface and the cylindrical portion. The tapered surface is preferably conical, and tapers radially outward as it extends toward the abutment surface, preferably at an angle of 12° (i.e., with a conical angle of 24°). The conical portion thus leads into the cylindrical portion, which forms a hole.

The inner diameter of the female die's inner surface cylindrical portion 40 is larger than the outer diameter of the tube 10 so that the tubular portion 37 of the female die 12 can receive the tube. A belleville washer 42, serving as a compliant member, is affixed to the base 36 within the tubular portion. The washer is sized and positioned to stop a tube that is received within the tubular portion, thus elastically maintaining the tube a predetermined distance from the base.

The female die's tapered, conical surface 41 has a minimum inner diameter smaller than the sleeve's nose tip 22, and a maximum diameter larger than the sleeve's nose tip. Thus, the tapered conical surface is positioned and sized to preset the nose tip of the sleeve 11 into the tube in a manner similar to that practiced with a 24° flareless female fitting.

The abutment surface 39 of the tubular portion 37 serves as a stop for the sleeve 11 during presetting of the sleeve into the tube. The abutment surface is sized and positioned to abuttingly receive the front face 26 of the sleeve shoulder 20 to stop the sleeve during presetting.

The cylindrical outer wall 38 of the female die tubular portion 37 has an outer diameter smaller than the largest outer diameter of the sleeve's shoulder 20.

The ring die 13 includes a radially disposed leading face 43, an inner swaging surface comprising a tapered swaging surface 44 and a cylindrical swaging surface 45, and a radially disposed trailing face 46. The cylindrical swaging surface extends axially from the trailing face, toward the leading face, to the tapered swaging surface. The tapered swaging surface extends axially from the cylindrical swaging surface to the leading face, with its diameter tapering radially outward as it approaches the leading face, which faces the female die when mounted in a swaging tool. While the tapered swaging surface may be conical or curved, preferably it is conical, tapering radially outward at an angle of 7° (i.e., with a conical angle of 14°). This angle provides a good trade off between the axial force and radial displacement bearing loads during swaging. While the ring die is preferably a unitary structure forming a continuous ring, it may be formed from multiple pieces, or as a partial ring (i.e., having a gap).

The smallest inner diameter of the ring die swaging surface is larger than the outer diameter of the cylindrical outer wall 38 of the female die tubular portion 37. Thus, the ring die 13 may be received around the tubular portion of the female die 12. The largest outer diameter 20a of the sleeve's shoulder 20 is larger than the smallest inner diameter of the ring die tapered swaging surface 44, however, it is smaller than the largest inner diameter of the ring die tapered swaging surface. Thus, the tapered surface of the ring die is positioned and sized to axially swage and radially displace the shoulder of the sleeve 11.

The leading face 43 and trailing face 46 of the ring die 13 preferably lie in parallel planes. The distance between these planes is less than or equal to the axial length of the female die tubular portion 37. Thus, after swaging the sleeve 11, the ring die may be received around the tubular portion, freeing the sleeve from contact with the ring die's swaging surfaces.

Figure 10:
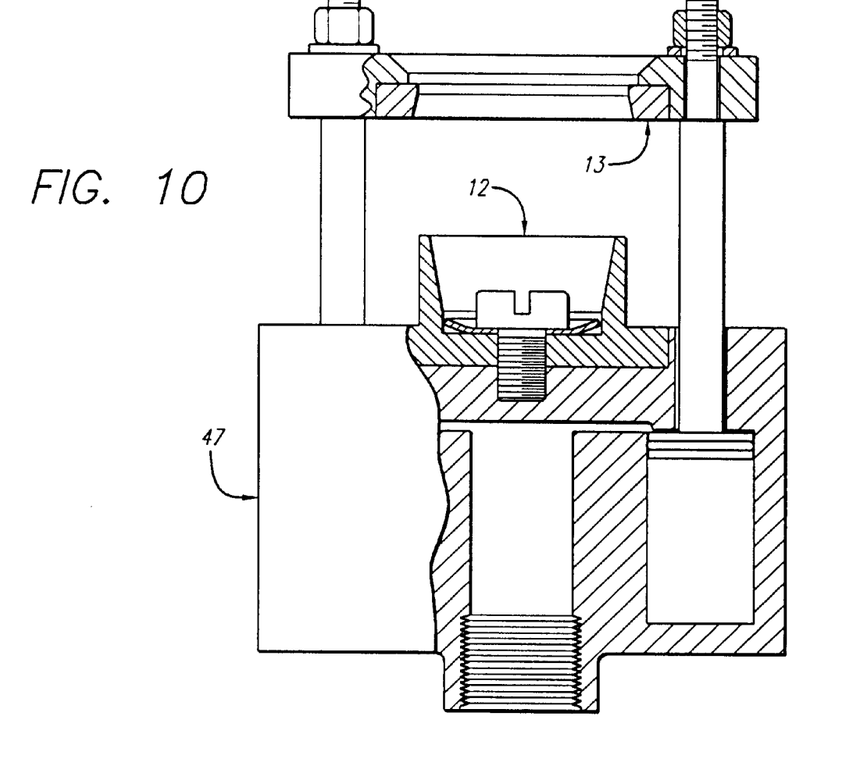
FIG. 10 is a cut-away plan view of a swaging tool assembly including the female die and ring die depicted in FIG. 9.

With reference to FIG. 10, the female die 12 and ring die 13 may be mounted in a swaging tool 47, as is known in the art of axial swaging. The swaging tool will be configured to mount a female die and a ring die in a position for axial swaging. The female die and ring die are mounted in the swaging tool such that the female die tubular portion extends toward, and is concentric with, the ring die swaging surface. A preferred swaging tool will hydraulically bring the dies together with adequate force for a swaging operation. The swaging tool may be bench mounted, or may be portable for work in the field.

FIGS. 6 and 10–13 depict a method of forming an axially-swaged, high-pressure capable male end fitting assembly according to the present invention. Essentially, the method is preferably performed with the above described components, and includes positioning the sleeve onto the tube and between the female die and ring die, and axially compressing the sleeve between the female die and the ring die.

If the tube does not have a second end capable of receiving a nut (not shown) for use with the male end fitting assembly, the nut should be slid onto the tube before performing the method of forming a male end fitting assembly.

In the method, the tube 10 and sleeve 11 are positioned within the tool assembly (see FIG. 6). The tool assembly includes the female die 12 and the ring die 13 mounted in the swaging tool (shown in FIG. 10). The tube is inserted within the sleeve, and the female die and ring die are axially spaced along the tube, adjoining the sleeve on axially-opposing sides of the sleeve. In this position, the front face of the sleeve shoulder confronts the abutment surface of the female die with a predetermined gap therebetween.

Figure 11:
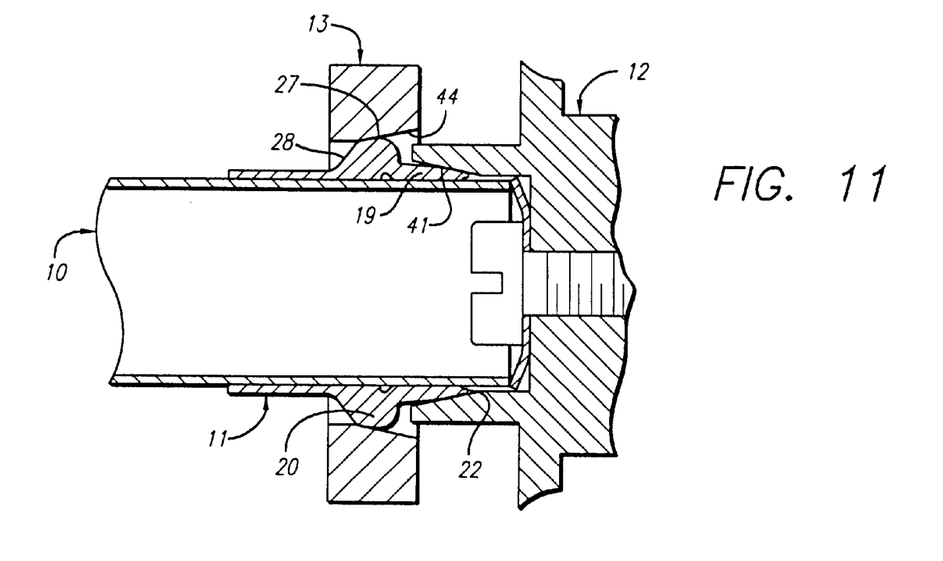
FIG. 11 is a cross-sectional, elevational view of the system depicted in FIG. 6 after axial forces have begun to preset the sleeve.

With reference to FIG. 11, the positioning does not require any specific order of events. In preferred order, the tip 22 of the sleeve nose 19 is first placed between the ring die 13 and female die 12, and placed into and adjoining the tapered surface 41 of the female die. The ring die is next moved to gently contact, square and center the sleeve, with the shoulder's top surface 27 adjoining the tapered swaging surface 44 of the ring die at or near the connection between the shoulder's top surface and rear face 28. The tube is then inserted through the ring die and sleeve. Passing into the female die, the tube is advanced through the tapered surface and into the hole (cylindrical portion 40) until it abuts the compliant member positioned to stop the advancement of the tube. In this position, the female die tapered surface is positioned to preset the sleeve nose, and the tapered swaging surface of the ring die is positioned to swage the sleeve shoulder 20. The sleeve is also positioned in a desired location on the tube, with enough tubing extending beyond the sleeve nose to form a strong preset, as is known in the art. Advantageously, this preferred method allows for positioning the sleeve from the side of the tool assembly, rather than requiring one die that disassembles to allow the positioning.

While it is preferable to mount the female die 12 and ring die 13 in the swaging tool 47 prior to the placement of the sleeve 11 and insertion of the tube 10, there is no requirement that it occur in this order.

Neither the ring die 13 nor the swaging tool (shown in FIG. 10) need extend significantly beyond the extension end of the sleeve. As a result, the tube may include significant bends in close proximity to the male end fitting assembly. This ability provides for significant weight savings in tightly packed hydraulic systems, such as are found in modern aircraft.

While other embodiments of a female die could include a passage to allow a tube to extend through the female die, the preferable female die includes a compliant member placed to consistently position the sleeve at a chosen location on the tube. The preferable compliant member is a belleville washer. The compliant member allows the tube to advance farther into the tubular portion of the female die during axial compression of the sleeve, such as occurs during a preset operation. The compliant member thus prevents the axial collapse of the tube during axial compression.

After positioning, the swaging tool (shown in FIG. 10) axially compresses the sleeve 11 between the female die 12 and the ring die 13 such that the sleeve nose 19 becomes preset into the tube 10 and the sleeve shoulder 20 becomes swaged into the tube (FIGS. 11–14). The presetting and swaging may occur sequentially or simultaneously, however, the presetting will complete at or before the completion of the swaging. While it is conceivable that the necessary axial forces could be commensurate, generally, (and preferably) the axial force necessary for swaging is substantially higher than the axial force necessary for presetting, and thus the presetting should complete before any (or little) swaging has occurred. Regardless of whether the preset completes before or at the same time as the swage, both operations preferably occur with the use of a single axial compression.

As is seen in FIG. 11, the female die 12 and ring die 13 axially compress the nose 19 of the sleeve 11 into and down the female die tapered surface 41. The sleeve advances down the tube 10 until the die deforms the nose radially inward to dig into and grip the tube.

Figure 12:
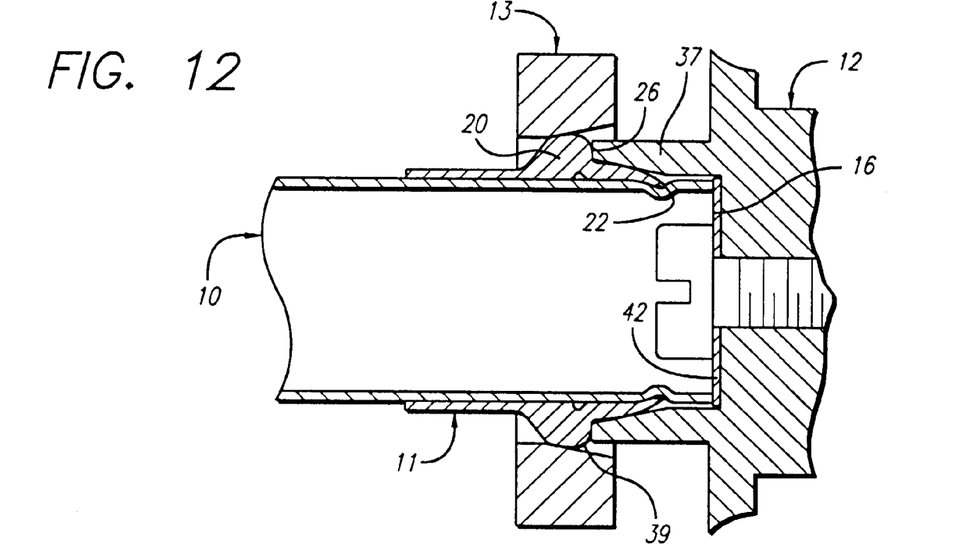
FIG. 12 is a cross-sectional, elevational view of the system depicted in FIG. 6 after axial forces have finished presetting the sleeve.

As shown in FIG. 12, the sleeve 11 and gripped tube 10, under axial forces from the female die 12 and a ring die 13, advance further into the tubular portion 37 of the female die. The nose tip 22 of the sleeve digs further into the tube in a presetting action, with the nose tip groove (23 in FIG. 8) further strengthening the grip of the tip on the tube. The nose deflects far enough to form a permanent deformation. The nose conical portion 25 contacts the female die tapered surface 41, deflecting inward to create a stronger, and axially longer grip on the tube than is known in the prior art.

The belleville washer 42 deflects to allow the tube end 16 to further advance. The abutment surface 39 of the female die 12 is configured to contact the front face 26 of the advancing sleeve's shoulder 20 at the position where a desired amount of preset has occurred. In this position, the tube 10 is not excessively deflected radially inward (which would restrict fluid flow), and the belleville washer has allowed the tube end to advance far enough to prevent excessive axial tube stress concentrations. After the shoulder contacts the abutment surface, no further presetting occurs, and the axial forces from the female die are delivered principally to the shoulder. In the highly unlikely case that the presetting requires as much axial force as the swaging, the use of an abutment surface to stop the sleeve would be optional.

Figure 13:
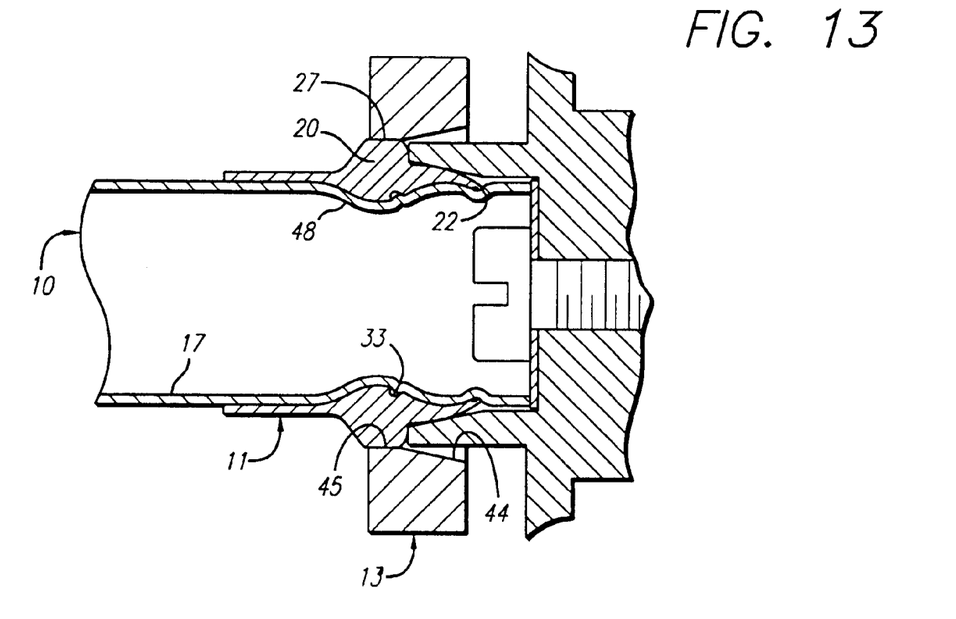
FIG. 13 is a cross-sectional, elevational view of the system depicted in FIG. 6 after swaging has occurred.

Depicted in FIG. 13, the axial forces then drive the ring die tapered swaging surface 44 over and past the shoulder 20. The conically tapered swaging surface of the ring die 13 radially compresses the shoulder, forcing it to pass within the smaller diameter of the cylindrical swaging surface 45 of the ring die. The abutment surface 39 reacts the high swaging forces, while the belleville washer 42 prevents the nose 19 from reacting a portion of those forces.

The (formerly) axially-curved top surface 27 of the shoulder 20 conforms to the cylindrical swaging surface 45. The portion 48 of the sleeve inner surface 17 that is longitudinally within the shoulder top surface deflects radially inward, developing a contour that approximately mirrors the former axially-curved profile of the top surface.

The conical nose portion 25, and the rounded corners 31, 32 connecting between the shoulder 20, and the extension 21 and nose 19, are stronger than comparable structure in the prior art (see FIG. 8). The strengthened and curved axial profile of the sleeve outer surface creates a gently varying axial profile along the entire length of the inner surface 17 affected by the swage. The swaged sleeve's inner surface in turn axially compresses the outer surface 15 of the tube 10. Because the sleeve inner-surface profile varies gently, the tube outer surface conforms to the sleeve inner surface, creating a stronger and better sealed connection. The shoulder region deforms in compression far enough to form permanent deformation.

During the swage, the sleeve's inner surface groove 33, which lies within the region deformed by the swage, digs into the tube 10. The groove's sharp corner 34 grips the tube 10, while the groove's gradual corner 35 allows the tube to more fully expand into the groove. The groove thus forms a stronger seal between the sleeve 11 and the tube. The groove is preferably positioned such that it is closer to the nose tip 22 than the axial location of the greatest radial sleeve thickness, thus placing it in an advantageous position to resist tube pull-out under axial loading. The use of more than one groove might provide greater tensile strength.

Figures 14, 15:
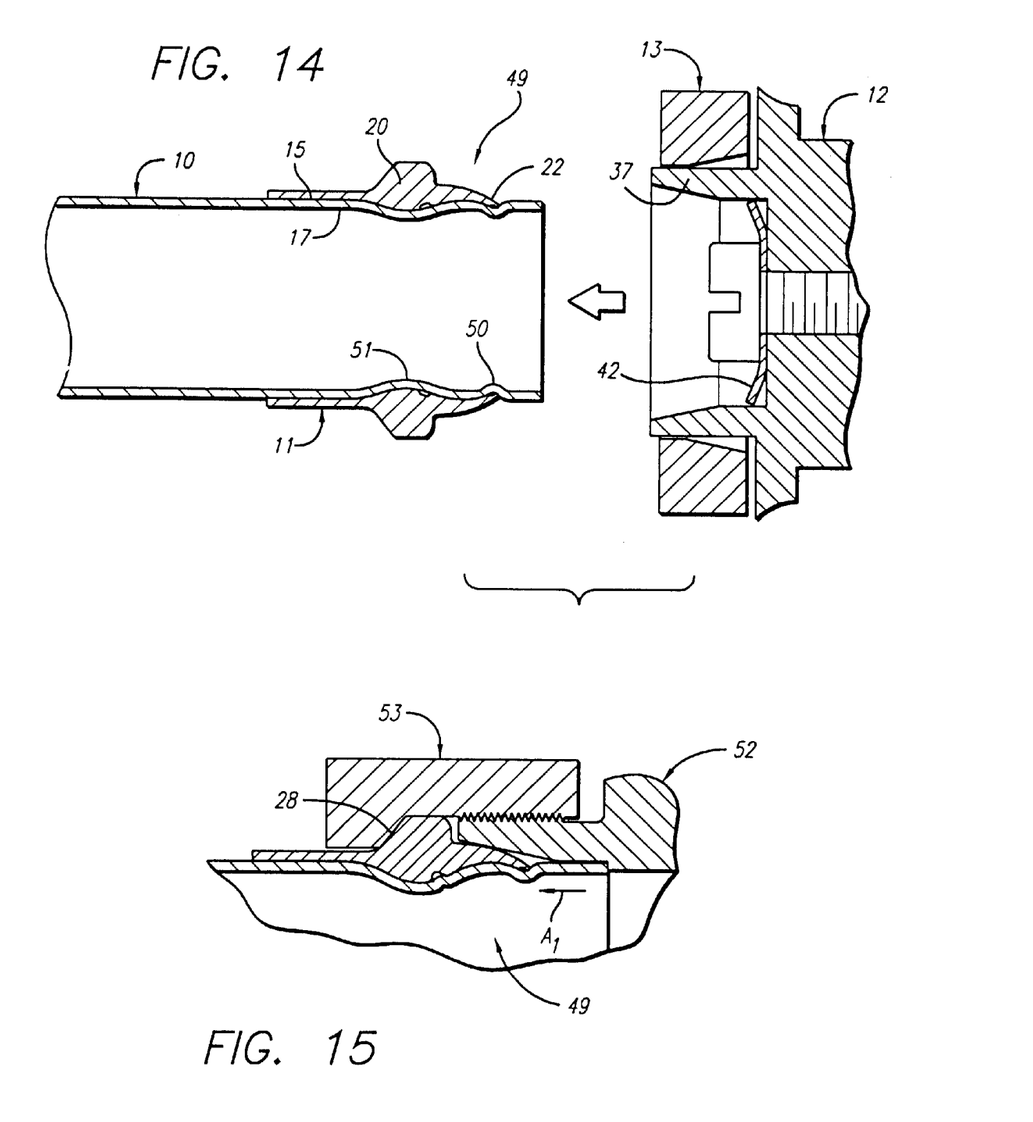
FIG. 14 is a cross-sectional, elevational view of the system depicted in FIG. 6 as the axially-swaged male end fitting assembly springs free of the ring die.
FIG. 15 is a cross-sectional, elevational view of the axially-swaged male end fitting assembly depicted in FIG. 14, as used with a 24° cone flareless female fitting.

Finally, as seen in FIG. 14, the swaging tool (shown in FIG. 10) drives the ring die 13 past the sleeve's shoulder 20 and onto the tubular portion 37 of the female die 12. When the shoulder loses significant contact with the ring die, the belleville washer 42 forces the male end fitting assembly (being the sleeve 11 on the tube 10) to spring from the female die. The spring action generally produces a pinging noise, notifying the swage tool operator that the operation has completed properly. No further action is necessary to remove the male end fitting assembly from the operation, and the tool assembly may be axially reset to immediately make another axial swaged end fitting.

The resulting male end fitting assembly 49 is an axially-swaged end fitting. The nose tip 22 of the sleeve 11 is radially deformed into the tube 10 forming a first ring-shaped indentation 50 in the tube. The shoulder 20 is swaged into the tube forming a second ring-shaped indentation 51 in the tube. The outer surface 15 of the tube conforms to the inner surface 17 of the sleeve, creating a strong connection.

With reference to FIG. 15, the male end fitting assembly 49 is ready to be connected to a 24° cone flareless female fitting 52 with a standard 24° cone flareless fitting nut 53. The shoulder rear face 28 serves as an interface between the male end fitting assembly and the nut. As is standard for this type of fitting, this interface is at 45°, causing connection forces to be distributed in both an axial and a radial direction. The axial component of the nut load, after allowing for friction, appears at the nose tip groove of the fitting as an inward radial load whose magnitude is about 2.5 times the magnitude of the axial component of the load. This causes the nose of the fitting to curl inward creating a conical surface facing outward which creates a small force vector $A_1$, pointing toward the extension 21 end of the fitting. At the same time, the radial force vector is causing the sleeve to move radially inward, increasing the distance between the swage indentation and the preset indentation, thus causing the already intimate contact between the tube and fitting to increase. In effect, the tube and the sleeve act as a unit to resist further deformation due to nut loads, providing good resistance to adverse effects from over-torquing. The same mechanism (i.e., high load intimate contact over a wide area) adds to the torsional and tensile strength of the male end fitting assembly.

From the foregoing, it will be appreciated that the present invention provides a sleeve, tool assembly, and method of using the sleeve and tool assembly to form an axially-swaged, high-pressure capable male end fitting assembly that functions with cone female fittings such as a 24° cone flareless female fitting. It provides male end fitting assemblies demonstrating high-pressure capability, low size and weight, excellent tensile and torsional strength, and excellent flexural endurance, the combination of which is superior to the prior art. The length of time required and expense involved in the making of a fully qualified and inspected fitting are improved. The resulting male end fitting assembly is substantially more resistant to over-torquing than prior art preset male end fitting assemblies.

While a particular form of the invention has been illustrated and described, it will be apparent that various modifications can be made without departing from the spirit and scope of the invention. For example, variations of the sleeve and/or tool assembly that allow for a plurality of swage sites to further strengthen the connection are within the scope of the claimed invention. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

I claim:

1. A method of making at least one male end fitting assembly, comprising:

providing a tube, a sleeve, and a tool assembly, the sleeve including a shoulder, the tool assembly including a swaging tool, a female die and a ring die, wherein said female die and said ring die are mounted in said swaging tool, wherein said ring die defines a compression surface forming a passageway positioned and sized to plastically compress said shoulder into said tube when said sleeve passes entirely through the passageway;

positioning said sleeve and said tube within said tool assembly, wherein said tube is inserted within said sleeve, said female die and said ring die are axially spaced along said tube, and said female die and said ring die adjoin said sleeve from axially-opposing sides of said sleeve; and loading said ring die toward said female die to pass said ring die over said shoulder such that said shoulder becomes plastically compressed into said tube and, relative to said ring die, said shoulder passes entirely through the passageway of said ring die.

2. The method of claim 1, wherein said step of positioning includes placing said sleeve between said ring die and said female die, followed by passing said tube through said ring die and then through said sleeve; and subsequently comprising repeating said step of positioning and said step of loading while using a second sleeve and a second tube, thereby making a second male end fitting assembly.

3. The method of claim 2, wherein said ring die used in said step of providing is a unitary structure forming a continuous ring.

4. The method of claim 1, wherein said shoulder used in said step of positioning includes a front face, wherein said female die used in said step of positioning has an abutment surface configured to abut the front face, and wherein the abutment surface applies loads to the front face to counter loads applied to the sleeve by the ring die during the step of loading.

5. The method of claim 4, wherein said step of positioning includes placing said sleeve between said ring die and said female die, followed by passing said tube through said ring die and then through said sleeve; and subsequently comprising repeating said step of positioning and said step of loading while using a second sleeve and a second tube, thereby making a second male end fitting assembly.

6. The method of claim 1, wherein:

the sleeve includes a nose;

the female die includes a tapered surface positioned and sized to preset the nose into the tube; and passing said ring die over said shoulder causes the sleeve's nose to become preset into said tube.

7. The method of making an axial swaged male end fitting assembly of claim 6, wherein said step of positioning includes abutting said tube against a compliant member on said female die, the compliant member longitudinally positioning the tube in an initial position with respect to the sleeve, and wherein during said step of loading, the compliant member yields to allow the tube to advance from the initial position into the tubular portion of the female die, relative to the tapered surface.

* * * * *